United States Patent

Simms et al.

[15] 3,696,621
[45] Oct. 10, 1972

[54] METHOD OF SOIL STABILIZATION

[72] Inventors: Bernard B. Simms, Franklin Square; Alvin A. Stein, Brooklyn, both of N.Y.; Charles N. Larosa, Arnold, Md.

[73] Assignee: The United States of America as represented by the Secretary of the Navy

[22] Filed: Aug. 10, 1970

[21] Appl. No.: 62,684

[52] U.S. Cl. .................................................61/36 R
[51] Int. Cl. ..............................................E02d 3/14
[58] Field of Search............166/295; 61/36 R; 1/260

[56] References Cited

UNITED STATES PATENTS

| | | | |
|---|---|---|---|
| 2,856,380 | 10/1958 | Roth et al. | 260/41 R |
| 2,842,338 | 7/1958 | Davis et al. | 166/295 |
| 3,268,002 | 8/1966 | Fischer | 166/295 X |
| 3,401,747 | 9/1968 | Coulter et al. | 166/295 |
| 3,418,813 | 12/1968 | Dillon | 61/36 R X |
| 3,545,130 | 12/1970 | Strother et al. | 61/36 R X |

FOREIGN PATENTS OR APPLICATIONS

| | | | |
|---|---|---|---|
| 929,679 | 6/1963 | Great Britain | 61/36 R |
| 730,550 | 5/1955 | Great Britain | 61/36 R |

OTHER PUBLICATIONS

Gaylord, Norman G. High Polymers Vol. 13: Polyethers, Part I. N.Y., Interscience 1963 pp. 273, 274.

*Primary Examiner*—Stephen J. Novosad
*Attorney*—Richard S. Sciascia, Louis B. Applebaum and Ernest F. Weinberger

[57] ABSTRACT

In situ complexation of two water soluble polymer solutions is effected by alternately spraying the solutions on the soil to be stabilized. The first solution is a water solution of approximately 1–2 percent by weight of polyethylene oxide and is deposited to a loading of about 0.1 pound per square yard. The second solution is another water solution of approximately 10–20 percent of polyacrylic acid loaded to about 0.5 pound per square yard. Repetitive spraying will provide thicker stabilized surfaces.

6 Claims, No Drawings

3,696,621

METHOD OF SOIL STABILIZATION

The invention described herein may be manufactured and used by or for the Government of the United States of America for governmental purposes without the payment of any royalties thereon or therefor.

BACKGROUND OF THE INVENTION

1. Field of the Invention

The present invention relates to dry dusty soil surface treatment and more particularly pertains to the stabilization of surface soil to provide a relatively hard, compact surface layer which will not be blown away and will have sufficient support strength.

2. Description of the Prior Art

In the field of soil stabilization it has been the general practice to employ any number of techniques to minimize soil erosion, blowing and loss of support strength. These include soil conservation such as sowing with rapid growth grasses, ground coverings including plastic or metal mats and plastic sheet membranes, storm fences and conventional compacting and, finally, paving with concrete or asphalt. These methods have proved unsatisfactory. Seeding grass requires an extensive growing period and is not suitable for all soils. The use of mats or membranes is ineffective due to warping and curling of the edges. Compacting and paving are both expensive and time consuming. The present invention solves the problem as well as overcoming these difficulties.

SUMMARY OF THE INVENTION

The general purpose of this invention is to provide a method of soil stabilization that has all the advantages of similarly employed techniques and has none of the above described disadvantages. To attain this, the present invention provides a unique series of solutions for alternate application to the soil. The first water solution comprises 1–2 percent by weight of polyethylene oxide, and is applied to the soil at approximately 0.1 lb/sq yd and is followed by a second application of a 10–20 percent water solution of polyacrylic acid loaded to about 0.5 lb/sq yd.

OBJECTS OF THE INVENTION

An object of the present invention is to provide an inexpensive, simple, reliable and effective means to stabilize fine dusty soil surfaces.

Another object is to provide a method for the treatment of dry dusty soil in situ and stabilize the same to a hardness that will enable it to support light vehicle traffic.

Still another object is to provide a stabilization soil treatment which is water insoluble while remaining permeable.

A further object is to provide a technique for stabilizing soil substrate suitable for road building operations.

Other objects and many of the attendant advantages of this invention will be readily appreciated as the same becomes better understood by reference to the following detailed description.

DESCRIPTION OF THE PREFERRED EMBODIMENT

In areas and terrain where the soil is dry and loosely formed and compacted, the small particulates are subject to rapid movement and displacement under the action of air movements that are generated naturally or are manmade. This dust movement creates clouds that restrict visibility and tend to expose the presence of personnel and equipment. The technique of this invention is based on the in situ complexation of two water soluble polymer solutions which are alternately sprayed on the soil surface to be stabilized. The first is a 1–2 percent by weight of polyethylene oxide in water solution and is sprayed on the soil to be treated to a loading of approximately 0.1 lb/sq yd. One such suitable oxide formulation is manufactured by Union Carbide Corp. and designated as WSR–205. As soon as practicable thereafter, the same area is resprayed with a 10–20 percent water solution of polyacrylic acid to a loading of approximately 0.5 lbs/sq yd. The soil surface thus treated is immediately stabilized to high wind conditions such as might be generated by the rotor downwash of a helicopter. During the period when the treated soil is wet, it is both elastomeric and water insoluble. Upon drying, the soil surface becomes hard and water insoluble while remaining water permeable. This latter characteristic of water permeability permits the build up of thick surface layers sufficient to support vehicular traffic. A single two solution spray provides a complexed soil and polymer surface thickness of approximately one-eighth of an inch. Repetitive applications will provide thicker and thicker surface layers by building downward since the upper layers are water insoluble but permeable. This technique is equally suited for various types of soil including clay, silt, and fine sand.

Another method of application to attain even thicker layers capable of supporting heavier loads is designated as the "roto-till technique." This method is readily adaptable to silt, clay and fine sand beds where the polyethylene oxide and polyacrylic acid in powder form are dry mixed with the soil and roto-tilled therein. A suitable application has been found to be approximately 10 lbs of each powder for every 2.5 cubic yards of terrain. The treated soil is then wet down to obtain a slightly muddy consistency and thereafter permitted to dry. The technique provides the following distinct advantages:

1. all ingredients are water soluble and therefore water is the only solvent necessary;

2. since any type of water can be used (including brackish water) and it is almost universally available, the only logistic problem is the transport of the two dry powders;

3. soil areas require no pretreatment, and by repeated treatments additional stabilization depths can be attained.

It is clear from the foregoing that the polymers could be mixed and stored separately in aqueous solutions until applied to the soil when required.

Obviously many modifications and variations of the present invention are possible in the light of the above teachings. It is therefore to be understood that within the scope of the appended claims the invention may be practiced otherwise than as specifically described.

We claim:

1. A method of soil stabilization which comprises:
    applying a first aqueous solution of 1–2 percent by weight of polyethylene oxide to the soil surface to be treated, and then applying a second aqueous solution of 10–20 percent by weight of polyacrylic acid to said soil to provide a water insoluble treatment.

2. The method according to claim 1 wherein said aqueous solution of polyethylene oxide is applied to said soil at a rate of 0.1 lb per square yard.

3. The method according to claim 2 wherein said aqueous solution of said polyacrylic acid is applied at a rate of 0.5 lbs per square yard.

4. A process for stabilizing soil comprising the steps of:
mixing polyethylene oxide and polyacrylic acid in powder form with said soil,
adding water to said mixed soil and drying said soil mixture.

5. The process according to claim 4 wherein approximately 10 pounds of each of said powders is mixed with each 2.5 cubic yards of soil.

6. A method of soil stabilization which comprises:
applying a first aqueous solution of 1–2 percent by weight of polyethylene oxide to the soil surface to be treated, then
applying a second aqueous solution of 10–20 percent by weight of polyacrylic acid to said soil to provide a water soluble treatment, then
repeating the steps set forth above to increase the depth of treatment of such soil.

* * * * *